May 27, 1969

H. J. DUCK 3,446,948

AIRCRAFT INSTRUMENT CORRECTION

Filed Aug. 31, 1964

HENRY JAMES DUCK
INVENTOR

ATTORNEY

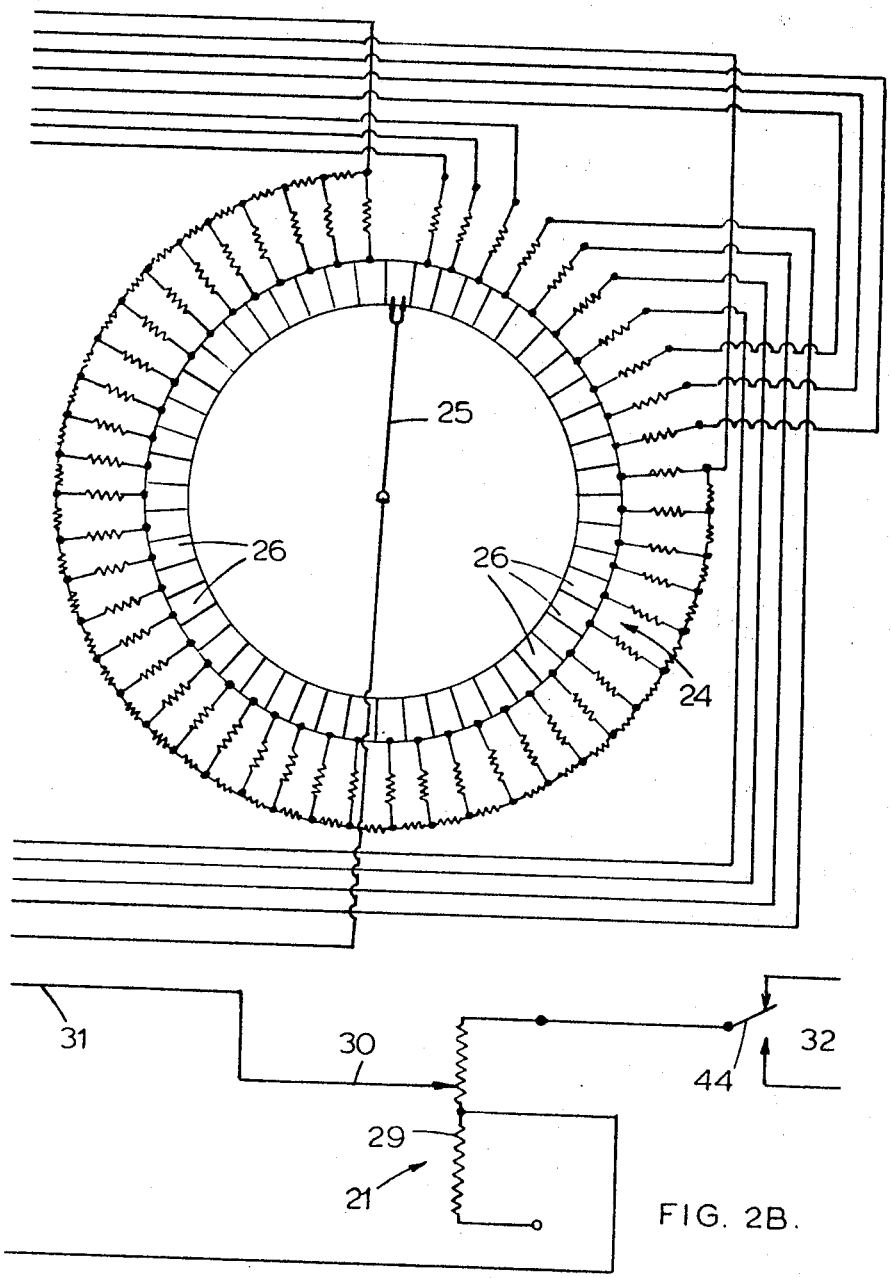

United States Patent Office 3,446,948
Patented May 27, 1969

3,446,948
AIRCRAFT INSTRUMENT CORRECTION
Henry J. Duck, Sutton, Surrey, England, assignor to Mechanism Limited, Croydon, Surrey, England, a British company
Filed Aug. 31, 1964, Ser. No. 393,217
Claims priority, application Great Britain, Aug. 29, 1963, 34,229/63
Int. Cl. B64d *43/00*
U.S. Cl. 235—151.3                                6 Claims

ABSTRACT OF THE DISCLOSURE

A device for producing, for aircraft instruments, corrected static pressure from uncorrected static pressure. The air in the static pressure system is compressed or decompressed by a variable speed fan. A computing circuit calculates the required correction pressure from Mach number and altitude signals which are produced by a transmitting Machmeter and a transmitting altimeter. The transmitting Machmeter and altimeter are fed with uncorrected static pressure and pitot pressure and uncorrected static pressure alone respectively. The required correction pressure is compared with the actual correction pressure across the fan and the difference is used to control the speed of the fan motor.

---

Figure 1:
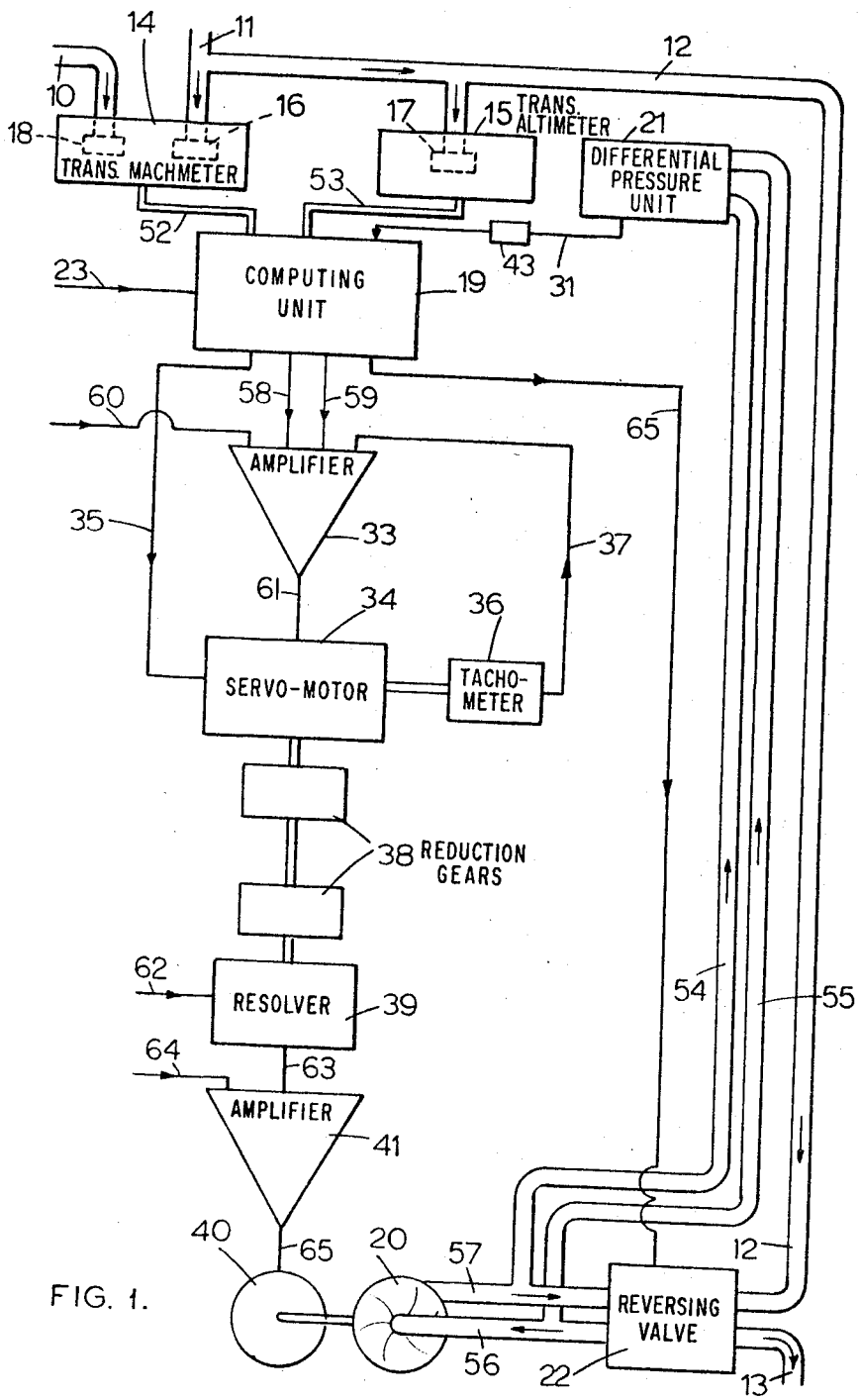

This invention relates to the correction of errors in aircraft instruments.

It is well-known that aircraft instruments such as Machmeters and altimeters operate in response to signals derived from pitot and static air pressures. The pitot pressure, which is the pressure caused by the aircrafts air speed (in addition to the ambient atmosphere pressure), is usually obtained from an open-ended pitot tube; the static pressure, which should represent atmospheric pressure, is usually obtained from a vent in the body of a sensing head of the pitot tube or from a vent in the body of the aircraft. It has been found that even with careful siting of one or more of such vents, the pressure in the aircraft static pressure system differs from the ambient atmospheric pressure. This difference, which varies with airspeed and also with altitude, is particularly evident in high-speed flight.

It is an object of the present invention to eliminate or reduce aircraft instrument errors caused by differences between the pressure in the aircraft static system and the ambient atmospheric pressure.

According to the present invention there is provided a static pressure system for aircraft instruments, in which a variable effect fan is arranged to influence the static pressure fed to the instruments, and the fan effect is controllable in response to signals derived from a first pressure-responsive device to which incoming pitot pressure is fed and from a second pressure-responsive device to which incoming static pressure is fed.

Further according to the present invention there is provided an apparatus for incorporation in an aircraft instrument system, comprising a first pressure-responsive device arranged to be fed with incoming pitot pressure, a second pressure-responsive device arranged to be fed with incoming static pressure, a variable-effect fan arranged to influence the static pressure supply of the system, and means arranged to control the fan effect in response to signals derived from said first and second device.

Preferably, said fan is a variable speed fan to give the variable effect. Alternatively, a constant-speed fan of variable pitch or of variable tip clearance may be employed.

Preferably, said first pressure-responsive device is embodied in a transmitting Machmeter to which uncorrected static pressure is also fed and said second pressure-responsive device is embodied in a transmitting altimeter.

The incoming static pressure corresponds to an altitude which differs from the true altitude by an amount which varies with Mach number and altitude in a known manner for each type of aircraft. Thus, the signals can be automatically compensated for the static pressure errors and combined to control the fan speed and so effect correction of the error in the static pressure system which varies with both aircraft velocity and altitude.

In an alternative arrangement, the two pressure-responsive devices may be combined in a single instrument.

Suitably, a reversing valve is provided for reversing the fan effect to afford correction of both positive and negative errors, the valve being arranged across the inflow and outflow pipes of the fan. Alternatively, the fan may be a reversible action fan, i.e. with reversible direction of rotation or reversible pitch.

Preferably also, a circuit across the fan includes a pressure detector arranged to feed back an electrical signal to a control circuit which also receives signals from said pressure sensitive devices to afford comparison between desired and measured correction of static pressure.

Figure 2A:
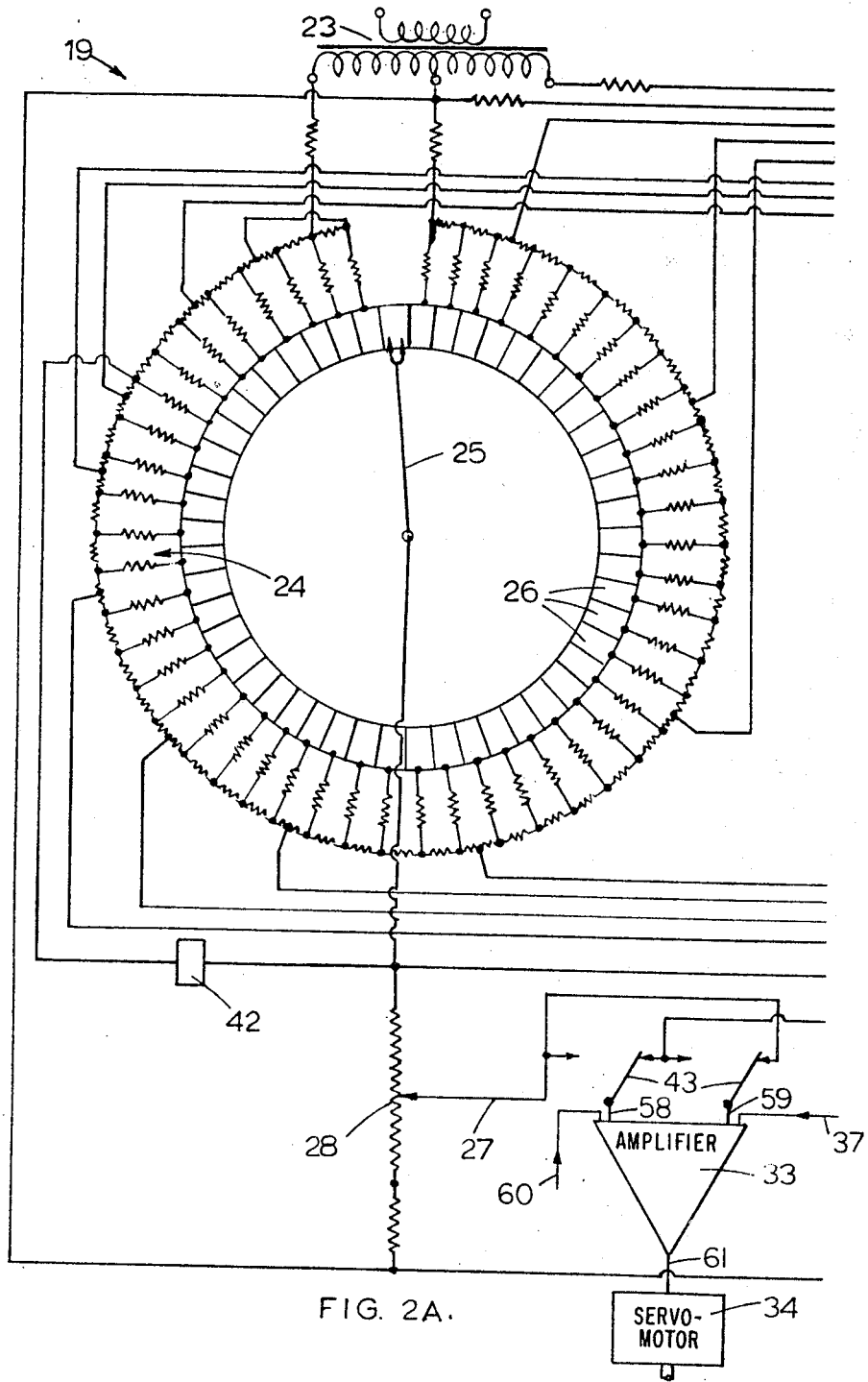

An embodiment of the invention will now be described, by way of example, with reference to the accompanying drawings in which:

FIG. 1 is a layout of an apparatus for correcting static pressure in an aircraft instrument system; and, FIGS. 2A and 2B comprise a circuit diagram showing a computing unit which is included in the apparatus of FIG. 1.

Referring to FIG. 1, the aircraft is provided with a pitot opening 10 to receive pitot or total air pressure and with at least one vent 11 to receive static air pressure. The static air pressure is fed through pipes 12 and 13 to a system of aircraft instruments which is closed (not shown), such as the Machmeter and the altimeter, and errors which may arise in the static pressure system.

A transmitting Machmeter 14 is arranged to receive incoming pitot pressure and static pressure from the opening 10 and the vent 11 respectively and a transmitting altimeter 15 is arranged to receive incoming static pressure from the vent 11, the incoming, and thus uncorrected, static pressure for the transmitting Machmeter and altimeter being taken from the static pressure supply system at an upstream point. The transmitting Machmeter and the transmitting altimeter include capsules 16 and 17, respectively, which are responsive to the static pressure. The transmitting Machmeter 14 also includes a capsule 18 which is responsive to the pitot pressure. The transmitting Machmeter and altimeter include transducers the input members of which are positioned in accordance with the pitot and static pressures received. The electrical signals produced by these transducers are fed to a computing unit 19 and for convenience the transducers are considered as included therein; the Machmeter 14 and the altimeter 15 are therefore shown in FIG. 1 connected to computing unit 19 by mechanical connections 52 and 53 respectively. The computing unit 19 which is programmed in accordance with the unique law $\Delta S/S$ as a function of M, where S is the static pressure, M is the Mach number, i.e. the ratio between true airspeed and the local speed of sound in air, and $\Delta S$ is the error in the static pressure, i.e., the difference between the incoming static pressure and the ambient atmospheric pressure. It is known that $\Delta S/S$ is a function of M and the relationship of $\Delta S/S + f(M)$ is predetermined for each type of aircraft.

Signals which are derived from unit 19 are employed to control a variable speed electric centrifugal fan 20 arranged in the static pressure system, upstream of the pipe 13 which branches to the various indicating or recording instruments of the aircraft. The fan acts to influence the static pressure fed to the instruments, the fan speed being so controlled that the static pressure fed to the aircraft instruments is corrected to represent accurately the ambient atmospheric pressure.

A differential pressure unit 21 is connected to the input and output of the fan 20 by pipes 54 and 55 respectively, to monitor the effects of the fan, and an electrically-operated reversing valve 22 arranged across pipes 12 and 13 is electrically connected to the unit 19, the reversing valve 22 being connected to the fan 20 by pipes 56 and 57.

The computing unit 19, illustrated in FIG. 2, is powered from transformer 23 the primary winding of which is the phase datum of the apparatus. The unit comprises commutators 24 which are swept by brushes 25 moved consecutively by the transmitting Machmeter 14. In practice as already stated, the brushes and also the commutators may be incorporated in the transmitting Machmeter, but it is convenient to regard the brushes and commutators as forming part of computing unit 19. The commutator segments 26 are energized by voltages in accordance with the aforementioned unique law and the step values are lower than those of the allowable operational error.

The transmitting altimeter 15 actuates wiper 27 of a potentiometric resistor 28 which is fed by the output voltage of the brushes 25. Thus, the potentiometric resistor 28 gives an electrical multiplication of $\Delta S/S$ by S to provide a voltage proportional to $\Delta S$ desired. The potentiometric resistor 28 is graduated logarithmically to provide a scale which gives equal percentage errors for similar linear movements, when the errors are computed on direct readings. Again, as already stated, it is convenient to regard the potentiometeric resistor 28 as part of the computing unit 19, whereas in practice this potentiometer may be at least partly incorporated in the transmitting altimeter 15.

A pressure "difference" signal is derived from the differential pressure unit 21 which is provided with a potentiometric resistor 29 having a servo-operated wiper 30. The output voltage from the potentiometric resistor 29 which is proportional to $\Delta S$ as measured by the detector unit 21 is fed through line 31 to the computing unit 19. A supply voltage indicated by reference 32 is the output of transformer 23.

The voltages proportional to $\Delta S$ measured and to $\Delta S$ desired appear on the lines 31 and 27 respectively and are fed through a double reversing switch 43 (referred to later) and lines 58 and 59 to separate inputs of a differential power amplifier 33. The amplifier 33 is energised from a supply line 60 and controls a servo-motor 34 through a line 61. The phase of the input signals to the amplifier 33 in relation to the phase datum which is transmitted to the servo-motor through line 35 (FIG. 1), is sensed and employed in driving the servo-motor 34 in the correct direction to null the pressure error i.e. the difference between the measured and desired $\Delta S$. A tachometer 36 is driven by the servo-motor 34 to provide a velocity feedback voltage, through line 37, to the amplifier 33. The tachometer 36 may be electrically connected to servo-motor 34 in FIG. 2, just as in FIG. 1 and driven by servo-motor 34 to provide a velocity feedback voltage, through a line 37, to amplifier 33.

The servo-motor 34 drives, through reduction gears 38, a resolver 39 energised through a line 62 to regulate the power for the correct speed of fan motor 40, the resolver being arranged so that movement of its rotor gives a constant voltage, variable phase shift output. The resolver output is fed through a line 63 and transformer to the gates of two silicon-controlled rectifiers in a bridge circuit (not shown) of a power amplifier 41. The amplifier 41, which is energised through a line 64, and applies variable power through a line 65 to motor 40, the power depending on the position of the resolver shaft.

In use of the apparatus, the fan is operated to compensate for error in the static pressure system. and does so by compressing or decompressing the air in the closed volume of the static system. The fan speed varies with the error which may vary from positive to negative values, the fan effect being controlled appropriately by the reversing valve 22 which is operated by a reversing signal from the computing unit 19 through a line 65 (FIG. 1 only). The valve 22 is solenoid-operated and operating signals for the solenoid are obtained from a switch 42 which simultaneously indirectly operates a double reversing switch 43 (shown in FIGURES 1 and 2) transposing the signals from potentiometric resistors 28 and 29 to amplifier 33, and a power reversing switch 44 for potentiometric resistor 29.

It will be appreciated that the invention provides for efficient correction of the pressure in the static system which is, of course, preferable to individual correction of the relevant instruments. Also, the invention is applicable to most existing aircraft systems with a minimum of adaptation. Further, the computing unit 19 and other associated electrical items may include printed circuit components which are readily replaceable whereby a basic apparatus may be employed in a range of aircraft by suitable selection of the circuit components.

Furthermore, the programme in the computing unit can be adapted to be tuned, for example by including one or more pre-set variable resistors, to accommodate differences between individual aircraft of the same type. These differences may occur after use and are determined by comparison of actual error with the measured error determined from previous calibration of the aircraft.

A further advantage inherent in the invention is that if stoppage of the fan occurs, either accidentally or by cut-out on overloading of part of the control system, the instruments will continue to function on, of course, uncorrected static pressure.

Modifications may be made without departing from the scope of the invention. For example, a potentiometer with resistors on the tappings, or other embodiment of a transducer, could be employed instead of the above commutators 24. Also, the potentiometric resistors 28 and 29 could be replaced by alternative forms of transducer.

I claim:

1. A static pressure system for aircraft instruments, uncorrected static pressure being fed to the static pressure system which includes a motor, a variable-effect fan which is driven by the motor and produces corrected static pressure from the uncorrected static pressure by compressing or decompressing the air in the closed volume of the static system, the air flow through the fan being zero when the pitot and static pressures are unchanging as all pitot and static pressures, a first pressure responsive device to which uncorrected static pressure and pitot pressure are fed and which produces a signal representative of the Mach number, a second pressure responsive device which the uncorrected static pressure is fed and which produces a signal representative of the uncorrected static pressure, computing means to which the signals representative of the Mach number and the uncorrected static pressure are fed and which produces a signal representative of the required difference between the uncorrected static pressure and the corrected static pressure, measuring means which produce a signal representative of the actual difference between the uncorrected static pressure and the corrected static pressure, comparator means to which the signals representative of said actual and required differences are fed and which produces an output signal dependent on the difference between the signals representative of said actual and required differences, control means for the fan which alter the effect of the fan so as to reduce the output signal of the comparator means to zero.

2. A static pressure system as claimed in claim 1 wherein the fan is a variable speed fan, and the control means control the speed of the motor.

3. A static pressure system as claimed in claim 1 wherein the first pressure responsive device is a transmitting Machmeter and the second pressure responsive device is a transmitting altimeter.

4. A static pressure system as claimed in claim 1 which comprises a reversing valve connected across the fan.

5. A static pressure system as claimed in claim 1 wherein the computing means comprises a transducer which produces an electric signal in accordance with the ratio static pressure error/static pressure and which is actuated in accordance with the value of said signal representative of Mach number.

6. A static pressure system as claimed in claim 5 wherein the computing means also comprise a further transducer which is energised by the signal produced by the first mentioned transducer and which is actuated in accordance with the signal representative of the uncorrected static pressure.

References Cited

UNITED STATES PATENTS

| | | | |
|---|---|---|---|
| 2,439,239 | 4/1948 | Crever | 230—12 |
| 3,108,183 | 10/1963 | Ganley et al. | 235—150.2 |
| 3,299,701 | 1/1967 | Scarlett | 73—178 |

MALCOLM A. MORRISON, *Primary Examiner.*

ROBERT W. WEIG, *Assistant Examiner.*

U.S. Cl. X.R.

73—178